US005791148A

United States Patent [19]
Burrus

[11] Patent Number: 5,791,148
[45] Date of Patent: Aug. 11, 1998

[54] LINER OF A GAS TURBINE ENGINE COMBUSTOR HAVING TRAPPED VORTEX CAVITY

[75] Inventor: David L. Burrus, Cincinnati, Ohio

[73] Assignee: General Electric Company, Cincinnati, Ohio

[21] Appl. No.: 473,803

[22] Filed: Jun. 7, 1995

[51] Int. Cl.[6] .................................................. F02C 1/00
[52] U.S. Cl. ............................ 60/752; 60/749; 60/750
[58] Field of Search ............................ 60/738, 749, 750, 60/752

[56] References Cited

U.S. PATENT DOCUMENTS

| 2,592,110 | 4/1952 | Berggren et al. | 60/749 |
|---|---|---|---|
| 3,675,419 | 7/1972 | Lewis | 60/749 |
| 3,934,409 | 1/1976 | Quillevere et al. | 60/749 |
| 4,054,028 | 10/1977 | Kawaguchi | 60/749 |
| 4,192,139 | 3/1980 | Buchheim | 60/750 |
| 5,197,278 | 3/1993 | Sabla et al. | |
| 5,323,604 | 6/1994 | Ekstedt et al. | |

OTHER PUBLICATIONS

Hsu, K.Y., et al."Performance Of A Trapped–Vortex Combuster", AIAA 95–0810 (1995).

Primary Examiner—Charles T. Jordan
Assistant Examiner—Theresa M. Wesson
Attorney, Agent, or Firm—Andrew C. Hess; Patrick R. Scanlon

[57] ABSTRACT

A liner for a gas turbine engine combustor is disclosed having a non-linear cavity section, wherein air and fuel injected therein form a trapped vortex for igniting and stabilizing a flame in the combustor. The cavity section, which is substantially rectangular in shape, has an aft wall, a forward wall, and an intermediate wall connected at one end to the aft wall and at the other end to the forward wall. A plurality of passages are provided in the aft wall for injecting fuel therethrough and a plurality of air passages are provided in the aft wall surrounding each fuel passage for injecting air therethrough. Cooling holes are also provided in the aft wall, the forward wall, and the intermediate wall for reinforcing the fuel/air vortex flow in the cavity section.

9 Claims, 5 Drawing Sheets

LINER OF A GAS TURBINE ENGINE COMBUSTOR HAVING TRAPPED VORTEX CAVITY

The Government has rights to this invention pursuant to Contract No. F33615-93-C-2305 awarded by the United States Air Force.

BACKGROUND OF THE INVENTION

1. Field of the Invention

The present invention relates to a combustor for a gas turbine engine and, more particularly, to a liner for a gas turbine engine combustor having a trapped vortex cavity incorporated therein.

2. Description of Related Art

Advanced aircraft gas turbine engine technology requirements are driving the combustors therein to be shorter in length, have higher performance levels over wider operating ranges, and produce lower exhaust pollutant emission levels. To achieve this, such combustion system designs have become considerably more complex and costly compared with current technology combustion systems. For example, combustors having multiple annular dome configurations, such as the double annular combustor disclosed in U.S. Pat. No. 5,197,278 to Sabla et al. and the triple annular combustor disclosed in U.S. Pat. No. 5,323,604 to Eckstedt et al., have evolved which evidence the complexity of such advanced combustion systems. While these combustor designs are able to perform in accordance with their stated objectives, they are complex in design, generally requiring complicated fuel staging modes to maintain stability over their intended operating range and involve a substantial number of sub-assemblies for pre-mixing air and fuel in order to achieve a desired reduction in gas turbine emissions. Further, such combustor designs continue to be concerned with auto-ignition within the mixers and generally have involved an overall increase in the height and weight of the combustion system.

Accordingly, it would be desirable for a gas turbine engine combustor to be developed which avoids the problems associated with multiple annular combustors. Further, it would be desirable if a combustor having a high flow therethrough was able to have means for stabilizing the flame in its combustion chamber.

SUMMARY OF THE INVENTION

In accordance with one aspect of the present invention, a liner for a gas turbine engine combustor is disclosed having a non-linear cavity section, wherein air and fuel injected therein form a trapped vortex for igniting and stabilizing a flame in the combustor. The cavity section, which is substantially rectangular in shape, has an aft wall, a forward wall, and an intermediate wall connected at one end to the aft wall and at the other end to the forward wall. A plurality of passages are provided in the aft wall for injecting fuel therethrough and a plurality of air passages are provided in the aft wall surrounding each fuel passage for injecting air therethrough. Cooling holes are also provided in the aft wall, the forward wall, and the intermediate wall for reinforcing the fuel/air vortex flow in the cavity section.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
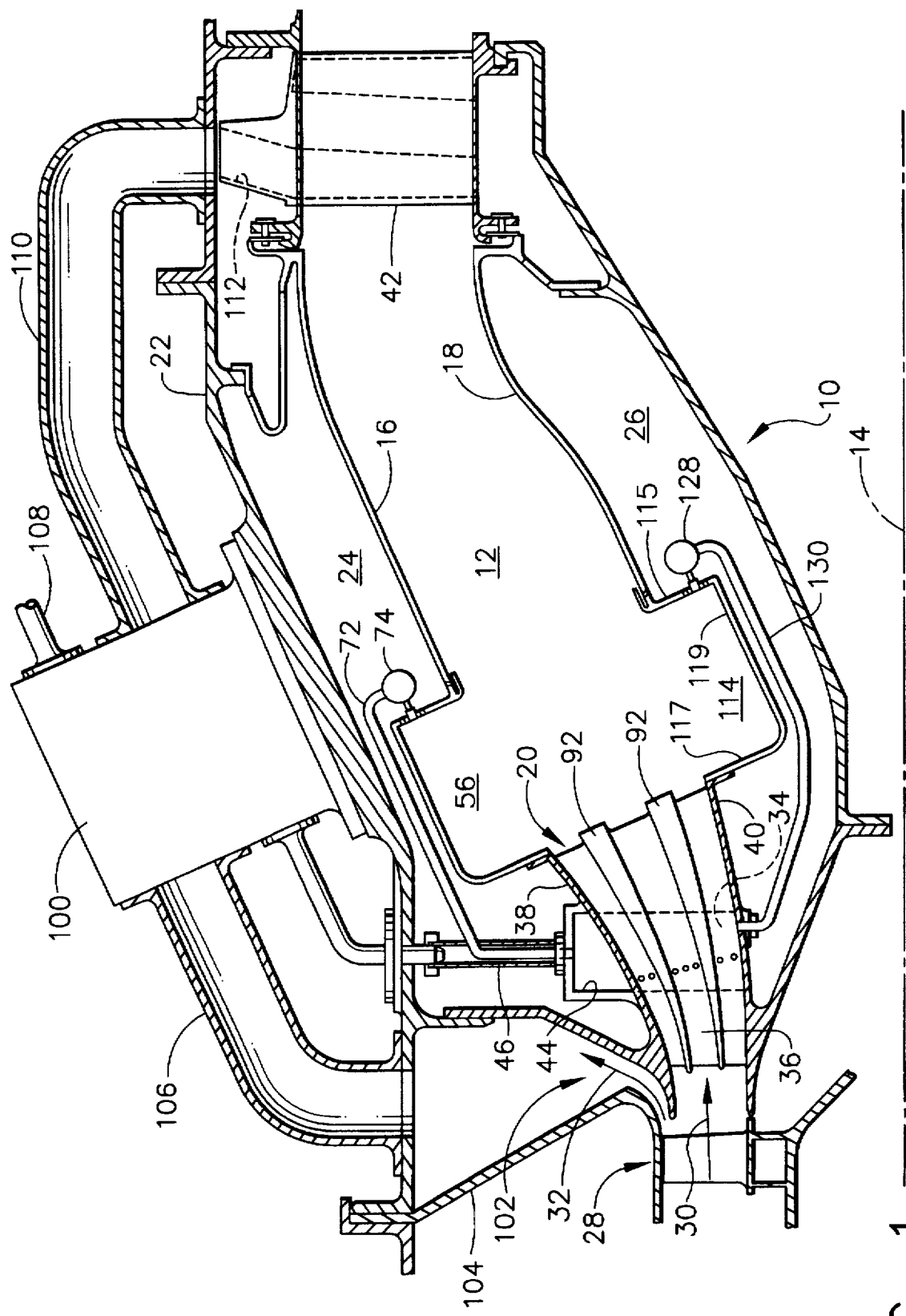
FIG. 1 is a longitudinal cross-sectional view of a combustor in accordance with the present invention.
Figure 2:
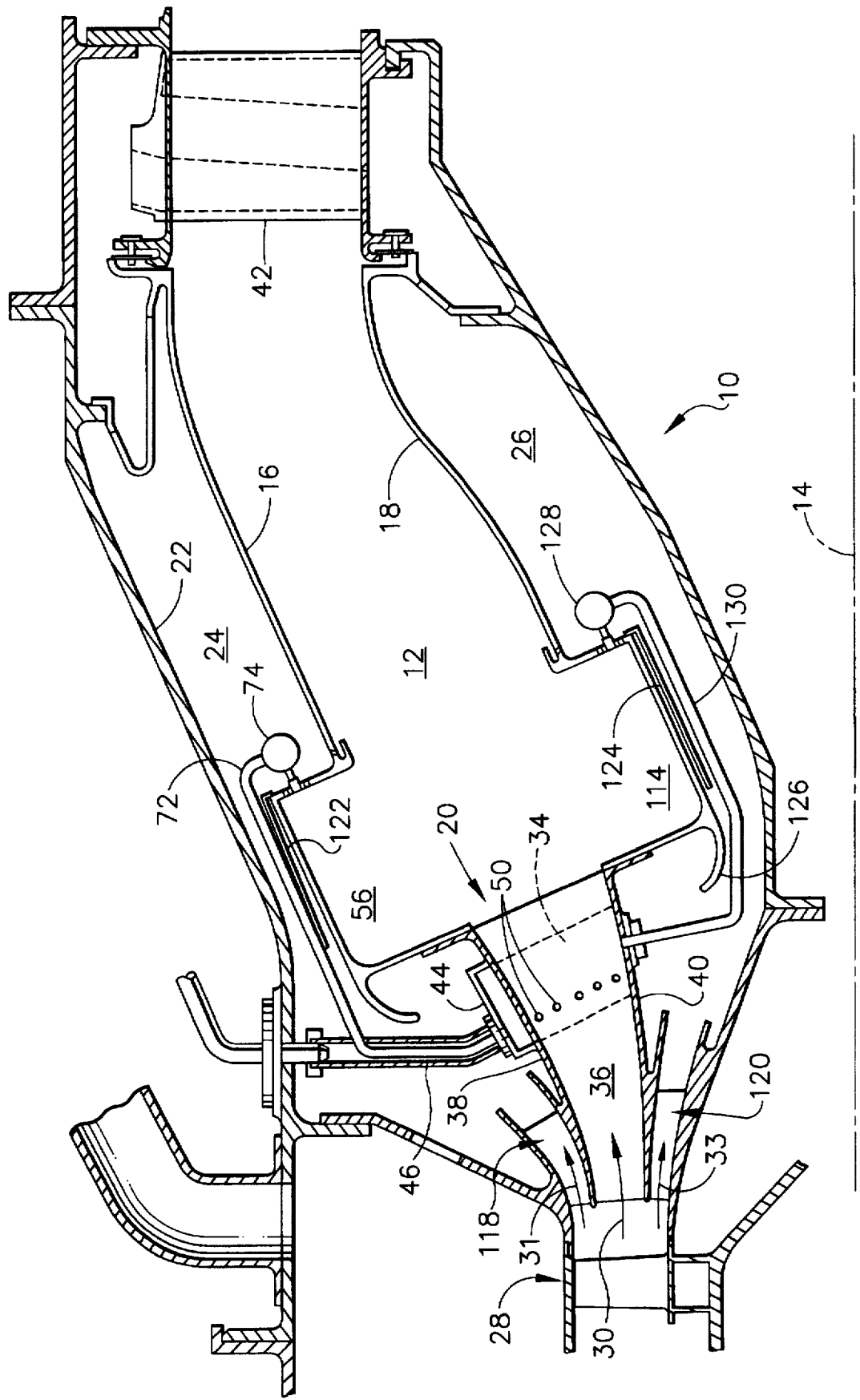
FIG. 2 is a longitudinal cross-sectional view of an alternate embodiment of a combustor in accordance with the present invention.

Referring now to the drawing in detail, wherein identical numerals indicate the same elements throughout the figures, FIGS. 1 and 2 depict a combustor 10 of the present invention which comprises a hollow body defining a combustion chamber 12 therein. Combustor 10 is generally annular in form about an axis 14 and is further comprised of an outer liner 16, an inner liner 18, and a dome inlet module designated generally by the numeral 20. An outer casing 22 is preferably positioned around combustor 10 so that an outer radial passage 24 is formed between casing 22 and outer liner 16 and an inner passage 26 is defined between an inner casing 22 and inner liner 18.

More specifically, it will be recognized that dome inlet module 20 reflects an effort to combine the individual diffuser, the fuel injector, and dome components of a standard annular combustor, while eliminating the need for a plurality of fuel/air mixers specifically designed and implemented for that task. By integrating the diffuser/fuel injector/mixer/dome functions into a single module, the length of combustor 10 is able to be substantially reduced (e.g., up to 35% of the length of a standard annular combustor).

It will be seen in FIGS. 1 and 2 that dome inlet module 20 is in flow communication with an exit end 28 of a compressor positioned upstream thereof. Accordingly, a substantial portion of the compressed air flow produced by the upstream compressor (80-90% in FIG. 1; approximately 50% in FIG. 2), as depicted by arrow 30 enters dome inlet module 20. Another portion of the compressed air flow produced by the upstream compressor is depicted by an arrow 32 in FIG. 1, and will be discussed in greater detail hereinafter. Likewise, air flow depicted by arrows 31 and 33 are directed into outer and inner passages 24 and 26, and will be discussed hereinafter. With respect to compressed air flow 30, it will be understood that it preferably has a high subsonic Mach Number flow (i.e., in a range of 0.3–0.5 Mach Number). Since dome inlet module 20 is absent of any swirl cups, premixers, or the like, it will be understood that compressed air flow 30 is generally able to flow freely through dome inlet module 20 into combustion chamber 12.

By eliminating the high pressure loss mixing devices of prior art combustors, dome inlet module 20 is able to reduce the overall combustor total pressure loss (from compressor discharge to turbine nozzle inlet) by up to 50% when compared with conventional designs.

Since it is desirable to provide some degree of residual swirl to compressed air flow 30, a plurality of hollow vanes 34 are preferably positioned circumferentially within a flow passage 36 defined by an outer member 38 and an inner member 40 of dome inlet module 20. Vanes 34 provide a mechanical load path within flow passage 36 in much the same way as struts do for a conventional diffuser. In this way, vanes 34 are able to maintain some degree of residual swirl (or completely de-swirl the flow if desired), so that the benefits thereof from the upstream compressor are passed along to a turbine downstream of combustor 10. In particular, it will be recognized that such residual swirl allows for a reduction in the required number of turbine inlet nozzle vanes, one of which is shown in FIGS. 1 and 2 and identified by the numeral 42. This, in turn, reduces turbine nozzle cooling requirements and enables an improvement in specific fuel consumption by the engine.

Figure 7:
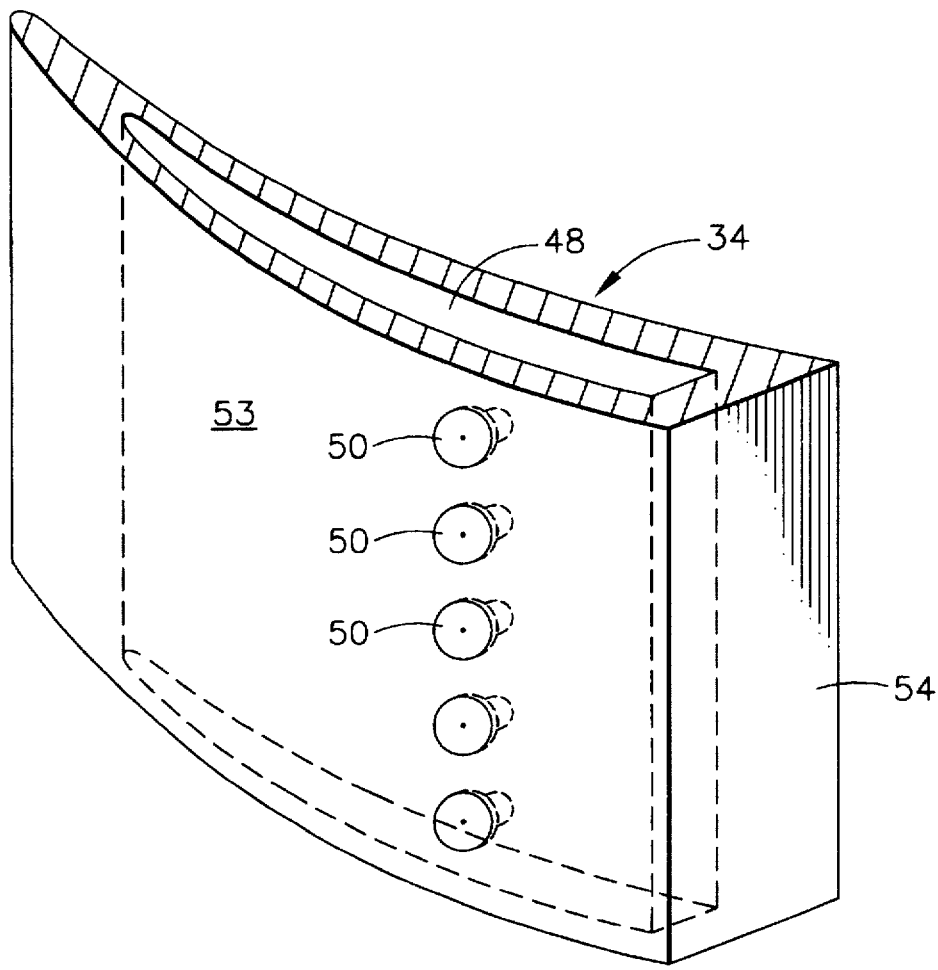
FIG. 7 is a schematic perspective view of a vane positioned in the flow passage of the dome inlet module depicted in FIGS. 1–3.
Figure 8:
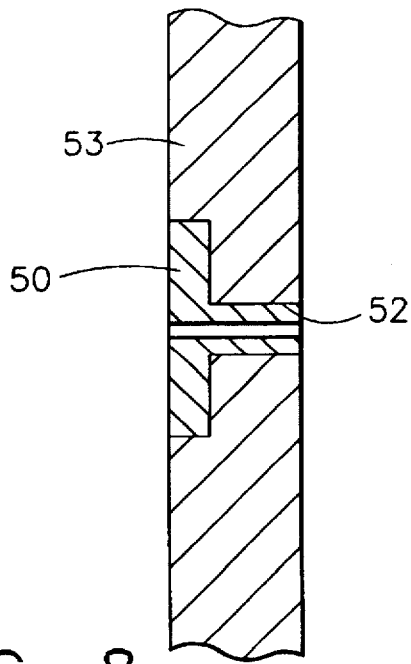
FIG. 8 is a partial cross-sectional view of the vane depicted in FIG. 7 taken along line 8—8.

In order to provide fuel into flow passage 36 of dome inlet module 20, whereby it can be mixed with compressed air flow 30 flowing therethrough, it is preferred that vanes 34 have a hollow configuration (as best seen in FIG. 7) which is in flow communication with a fuel manifold 44 positioned adjacent and around outer member 38 of dome inlet module 20. A passage 46 is utilized to provide fuel from a fuel supply (not shown) to fuel manifold 44. It will be understood, as seen from FIGS. 7 and 8, that fuel from fuel manifold 44 enters a hollow area 48 within each vane 34 and is thereafter injected into flow passage 36 through atomizers 50 positioned within a plurality of passages 52 formed in the suction and pressure surfaces of vane 34 (an example of an atomizer 50 positioned within passage 52 in suction surface 53 is depicted in FIG. 8).

Figure 3:
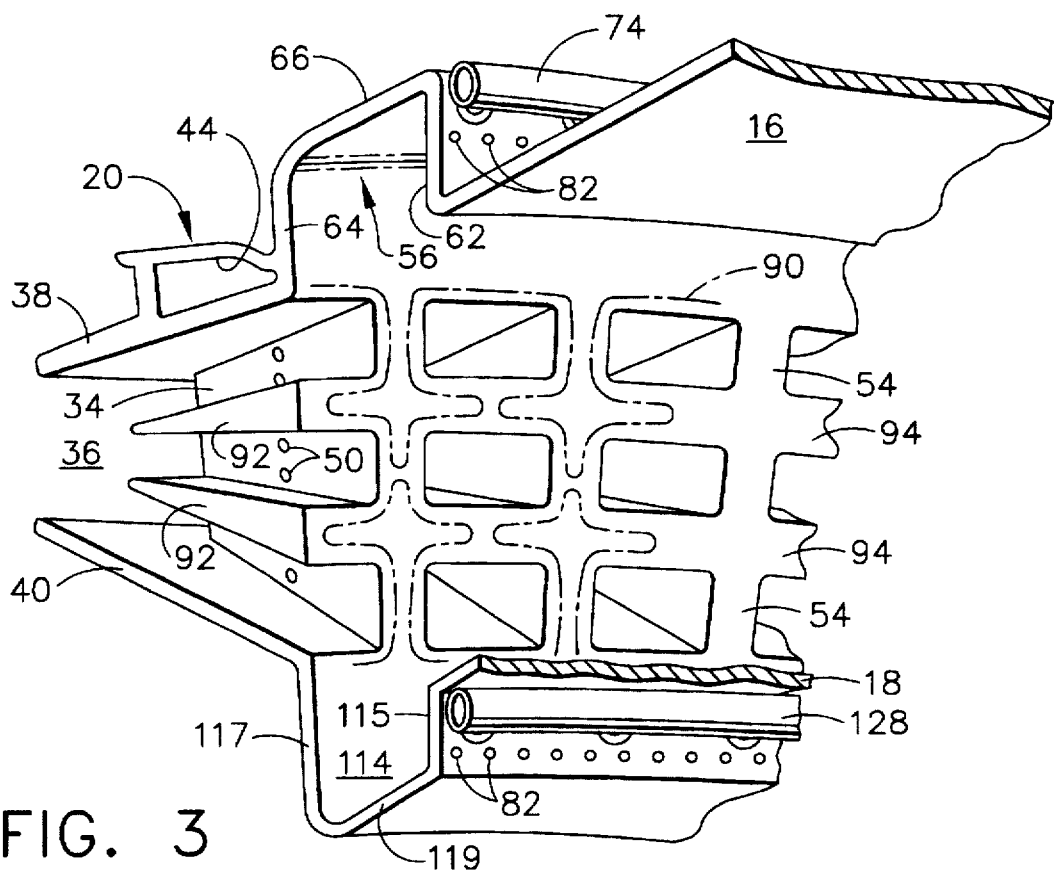
FIG. 3 is a partial perspective aft view of the dome inlet module and upstream end of the combustion chamber taken along line 3—3 of FIG. 2.

As seen in FIGS. 3 and 7, the trailing edges 54 of vanes 34 preferably are somewhat blunt in shape to generate waves and shear layers in fuel flow passage 36 so that mixing of fuel compressed air flow 30 is enhanced. In order to provide the desired amount of mixing of fuel and air within flow passage 36 of dome inlet module 20, the number of vanes 34 provided would typically be on the order of the number of compressor outlet guide vanes used in a conventional combustor design approach (e.g., approximately 100 to 120 vanes). The mixing of fuel and air within flow passage 36 is then able to be accomplished rapidly due to a large number (approximately 1,000) of individual injection sources in dome inlet module 20 and the shear layers that develop in compressed air flow 30 downstream of vanes 34.

As best seen in FIGS. 1 and 2, flow passage 36 formed by outer and inner members 38 and 40, respectively, of dome inlet module 20 generally has a shape in the form of a low area ratio diffuser. By so designing dome inlet module 20, the overall combustion system length is able to be reduced up to 35%. Moreover, the low diffusion level coupled with the high inlet flow velocity of compressed air flow 30 results in bulk flow velocities of the fuel/air mixture entering combustion chamber 12 that are much higher than for a conventional combustor (e.g., in a range of 300-600 feet per second). This high level of bulk flow velocity creates a desirable condition in which combustion cannot be initiated within flow passage 36 of dome inlet module 20, preventing a situation in which damage or failure of module 20 could occur due to the presence of hot combustion gasses formed by autoignition. Consequently, this allows the injection of fuel into compressed air flow 30 within flow passage 36, which provides a degree of distance and time for the fuel to mix with compressed air flow 30 before the resulting fuel/air mixture enters combustion chamber 12.

However, this difficulty of achieving and sustaining combustion in such a high velocity flow is carried downstream into combustion chamber 12 as well. Accordingly, to overcome this problem within combustion chamber 12, some means for igniting the fuel/air mixture and stabilizing the flame thereof is required. Preferably, this is accomplished by the incorporation of a trapped vortex cavity depicted generally by the number 56, formed at least in outer liner 16. Cavity 56 is utilized to provide a trapped vortex of fuel and air, which is ignited as necessary by an igniter 58 through an ignition port. It will be understood that the concept of a trapped vortex in and of itself is known in the art, as evidenced by a paper entitled "Performance of A Trapped-Vortex Combustor," by K. Y. Hsu, L. T. Goss, D. D. Trump of Systems Research Labs, Inc. in Dayton, Ohio and W. M. Roquemore of Wright Laboratory at Wright-Patterson Air Force Base, Ohio. However, as seen therein, the trapped vortex was formed within a centerbody member so that the fuel/air mixture flowed radially around a plurality of trapped vortices.

Figure 6:
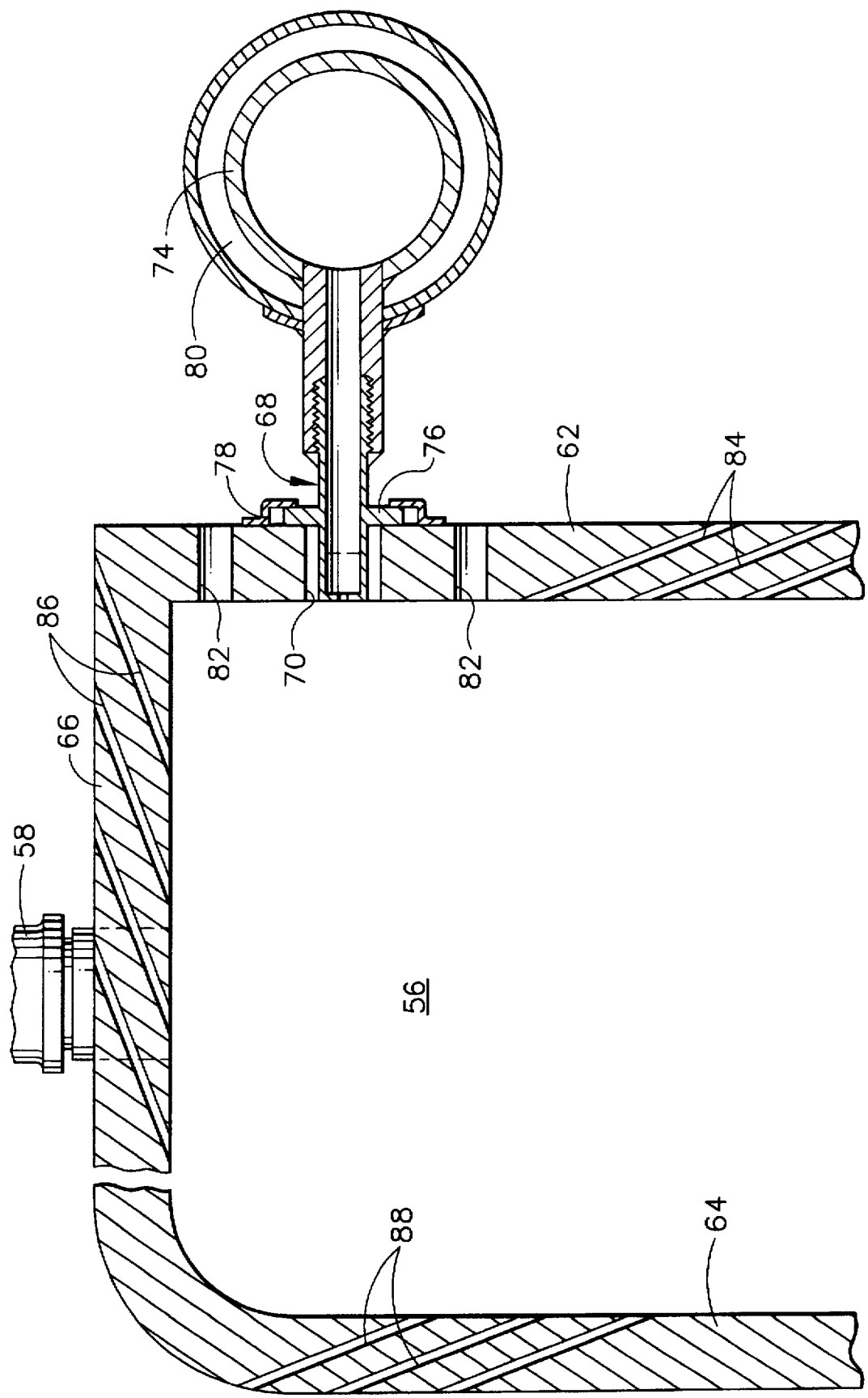
FIG. 6 is an enlarged, longitudinal cross-sectional view of part of the outer liner trapped vortex cavity and associated fuel injector depicted in FIGS. 14.

In the present invention, trapped vortex cavity 56 is incorporated into outer liner 16 immediately downstream of dome inlet module 20, and preferably within inner liner 18 as well. Trapped vortex cavity 56 preferably is substantially rectangular in shape, with it being open to combustion chamber 12, so that it is formed by an aft wall 62, a forward wall 64, and an outer wall 66 formed therebetween which preferably is substantially parallel to outer liner 16 (wherein "aft" refers to the downstream direction and "forward" refers to the upstream direction). Fuel enters trapped vortex cavity 56 through a fuel injector 68, which is centered within a passage 70 in aft wall 62. Fuel injector 68, which is in flow communication with an outer fuel manifold 74 that receives fuel by means of a conduit 72, preferably is the type which is threaded into fuel manifold 74 (see FIG. 6). Fuel injector 68 has a flange portion 76 which rests against aft wall 62 and preferably is retained by a ferrule 78 or other similar device since passage 70 is somewhat oversized to allow for thermal growth of fuel injector 68. It will also be seen from FIG. 6 that fuel manifold 74 preferably has an insulating layer 80 in order to protect fuel manifold 74 from the heat experienced thereby, insulating layer 80 having either air or some other insulating material therein.

Figure 4:
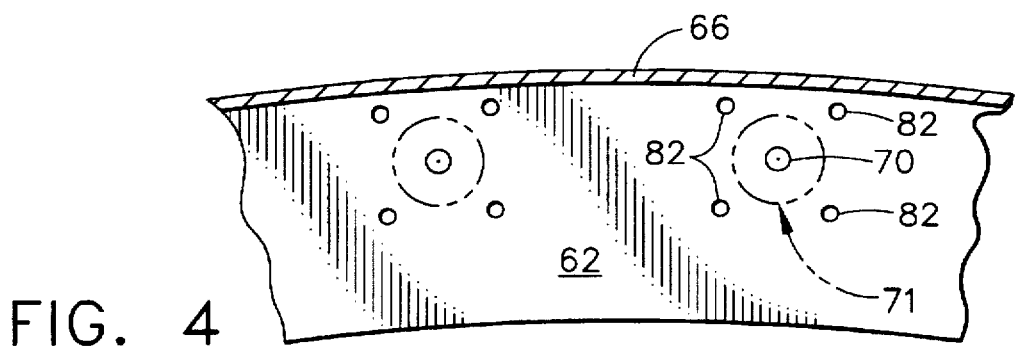
FIG. 4 is a partial front view of an aft wall in the outer liner trapped vortex cavity depicted in FIGS. 1–3.

Air is injected into trapped vortex cavity 56 by means of one or more passages 82 formed in aft wall 62 which preferably are positioned around fuel passage 70. As seen in FIG. 4, passages 82 are formed circumferentially around passage 70 in a square configuration since it is contemplated that fuel injector 68 will provide the fuel in a conical spray 71. It will be understood that any number of air passages 82 may be provided in any number of patterns, but that it is desirable that air passages 82 collectively form a surrounding sheet of air to rapidly mix with the fuel injected into trapped vortex cavity 56 and prevent the injected fuel from mixing with the air and being included within a boundary layer along aft wall 62, forward wall 64, and outer wall 66.

Figure 5:
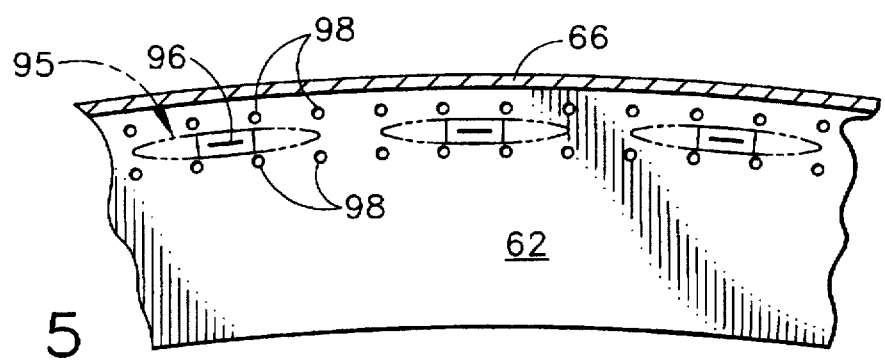
FIG. 5 is a partial front view of an alternate embodiment for an aft wall in the outer liner trapped vortex cavity depicted in FIGS. 1–3.

It will be noted that in FIG. 5 an alternative configuration for the injection of fuel and air into trapped vortex cavity 56 is provided. In this embodiment, fuel injector 68 injects fuel into cavity 56 in a thin fan spray 95 by means of a slot-shaped opening 96. Upper and lower rows of air passages 98 are formed in aft wall 62 in order to encourage the circumferential spreading of fuel entering cavity 56. As noted hereinabove, air passages 98 are situated in order to preferably provide sheets of air above and below the fuel entering cavity 56 in order to separate the fuel from aft wall 62, forward wall 64 and outer wall 66, as well as to better encourage the trapped vortex flow within cavity 56.

To further assist in the prevention of fuel from being located along the boundary layer of trapped vortex cavity 56, as well as assist in producing the desired trapped vortex of fuel and air within cavity 56, a plurality of cooling holes 84 are formed within aft wall 62, a plurality of cooling holes 86 are formed within outer wall 66, and a plurality of cooling holes 88 are formed within forward wall 64. It will be noted that cooling holes 84, 86 and 88 are angled to help promote the trapped vortex of fuel and air to be formed within cavity 56. It will also be noted that due to the entrance of air in cavity 56 from air passages 82 formed in aft wall 62, as well as cooling holes 84, 86 and 88, the direction of the trapped vortex within cavity 56 will be opposite that of the fuel/air mixture entering combustion chamber 12 from dome inlet module 20. Accordingly, the combustion gases generated by the trapped vortex within cavity 56 provide a continuous ignition and stabilization source for the fuel/air mixture entering combustion chamber 12. As best seen in FIG. 3, the flow of trapped vortex combustion gases, as depicted by dashed lines 90, flow adjacent the downstream end of dome inlet module 20 resulting in close circumferential spacing to effectively reduce the distance for the flame to spread within the fuel/air mixture entering combustion chamber 12. Spreading of the flame through such fuel/air mixture is also enhanced by the shear mixing layers generated by the wakes off vanes 34 of dome inlet module 20.

As an additional enhancement to spreading the flame provided by the trapped vortex in cavity 56, one or more circumferential splitters 92 (see FIGS. 1 and 3) may be provided within flow passage 36 of dome inlet module 20 between adjacent vanes 34 in order to partition compressed air flow 30 and subsequently the fuel/air mixture into a plurality of parallel streams. Splitters 92 provide additional shear mixing layers and further enhance the combustion process within combustion chamber 12 since a trailing edge 94 thereof provides a surface in which combustion gases 90 can further migrate at the downstream end of dome inlet module 20. It will be seen that circumferential splitters 92 preferably have a design in which its leading edge is lesser in thickness than its trailing edge 94, with trailing edge 94 having a somewhat blunt shape similar to trailing edge 54 of vanes 34 in order to promote wakes and shear mixing layers.

As seen in FIGS. 1 and 2, different cooling air schemes are provided therein. In FIG. 1, a heat exchanger 100 is provided which is positioned adjacent casing 22. A bleed opening 102 is provided between dome inlet module 20 and a forward wall 104 so that compressed air flow 32 can be bled therethrough and into an entry duct 106 in flow communication with heat exchanger 100. It will be seen in FIG. 1 that a fuel line 108 from a fuel supply (not shown) enters heat exchanger 100 and exits through a fuel passage consistent with fuel passage 46 shown in FIG. 2. An exit duct 110 carries air flow 32 therethrough, which has been cooled by means of the temperature difference with the fuel circulated through heat exchanger 100.

Exit duct 110 extends generally along casing 22 and opens principally into a hollow passage 112 within turbine inlet nozzle vane 42 so that the cooled air flow cools it. Thereafter, the cooled air flow continues into inner passage 26 in order to supply cooling air to inner liner 18 and the air necessary for the trapped vortex in an inner cavity 114 provided within inner liner 18 immediately downstream of inlet module 20. It will be seen that inner cavity 114 has an aft wall 115, a forward wall 117, and an inner wall 119 substantially parallel to inner liner 18. Similar to the trapped vortex cavity 56 described above, a plurality of cooling holes are formed within each of the aft wall 115, outer wall 119, and forward wall 117. Fuel is supplied to an inner fuel manifold 128 by means of a conduit 130 which is in flow communication with hollow area 48 of vanes 34 in dome inlet module 20. Another portion of the cooled air flow from exit duct 110 enters outer passage 24 in order to supply cooling air to outer liner 16 and the air for formation of the trapped vortex cavity 56.

In FIG. 2, an outer diffusing passage 118 and an inner diffusing passage 120 are provided adjacent dome inlet module 20 in order to supply air to outer and inner passages 24 and 26, respectively. It will be seen that outer and inner diffusing passages 118 and 120 are in flow communication with exit end 28 of the compressor upstream of combustor 10 so that portions 31 and 33 of the compressed air provided is split with dome inlet module 20. Further, it will be noted in this configuration that outer and inner bleed shields 122 and 124 are provided adjacent outer and inner walls 66 and 119 of outer cavity 56 and inner cavity 114. Bleed shields 122 and 124 are provided because cooling passages formed in outer and inner walls 66 and 119 are formed opposite the direction of flow thereto and bleed shields 122 and 124 cause stagnation of such flow so that it may be turned to flow through such passages. In the same regard, it will be noted that compressed air flowing into outer and inner passages 24 and 26 will be captured at forward walls 64 and 117 by a cowl 126 so that air will flow through passages formed in forward walls 64 and 117. Likewise, compressed air flowing into outer and inner passages 24 and 26 will be flowing in the same direction as cooling slots within outer and inner liners 16 and 18, respectively, but also will be turned therein so as to supply air to air passages 82 or 98 formed in aft walls 62 and 115, as well as cooling holes formed in aft walls 62 and 115, respectively.

Having shown and described the preferred embodiment of the present invention, further adaptations of the liner can be accomplished by appropriate modifications by one of ordinary skill in the art without departing from the scope of the invention. In particular, it will be noted that while the liners having a trapped vortex cavity of the present invention are utilized with a high inlet Mach combustor, they can be utilized with any annular combustor desiring greater flame stability in its combustion chamber.

What is claimed is:

1. A liner for a gas turbine engine combustor, comprising a generally annular body having an upstream end and a downstream end, said liner having incorporated therein a cavity section comprising an aft wall, a forward wall, and an intermediate wall connected to said aft wall at one end and said forward wall at the other end, each of said aft wall, said forward wall and said intermediate wall having a plurality of cooling holes therein for injecting air therethrough to reinforce a trapped vortex of fuel and air injected into said cavity section for igniting and stabilizing a flame in said combustor.

2. The liner of claim 1, wherein said cavity section is substantially rectangular in shape.

3. The liner of claim 1, further comprising a plurality of passages in said aft wall for injecting fuel therethrough.

4. The liner of claim 3, further comprising a plurality of passages surrounding each said fuel passage for injecting air therethrough.

5. The liner of claim 1, further comprising an igniter port in said cavity section, wherein ignition of said vortex a fuel and air is permitted to form combustion gases in said cavity section.

6. The liner of claim 1, wherein said cooling holes are aligned to cause said vortex of fuel and air to rotate in a direction toward said upstream end of said liner.

7. The liner of claim 1, wherein said liner is a radially outer liner of said combustor.

8. The liner of claim 1, wherein said liner is a radially inner liner of said combustor.

9. The liner of claim 1, wherein said cavity section is located adjacent said upstream end of said liner.

* * * * *